(12) United States Patent
Abbatiello et al.

(10) Patent No.: US 11,545,318 B2
(45) Date of Patent: Jan. 3, 2023

(54) KEYBOARD CONTAINING RECYCLED AND RENEWABLE POLYMERIC COMPOSITIONS

(71) Applicant: Dell Products L.P., Round Rock, TX (US)

(72) Inventors: Nicholas D. Abbatiello, Round Rock, TX (US); Xinhua Tian, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 17/083,143

(22) Filed: Oct. 28, 2020

(65) Prior Publication Data

US 2022/0130626 A1   Apr. 28, 2022

(51) Int. Cl.
| | |
|---|---|
| *G06F 3/02* | (2006.01) |
| *H01H 13/704* | (2006.01) |
| *H01H 13/88* | (2006.01) |
| *C08J 11/06* | (2006.01) |
| *C08J 11/10* | (2006.01) |
| *C08K 7/14* | (2006.01) |
| *C08L 71/02* | (2006.01) |
| *C08K 3/40* | (2006.01) |

(52) U.S. Cl.
CPC ............ *H01H 13/704* (2013.01); *C08J 11/06* (2013.01); *C08J 11/10* (2013.01); *G06F 3/0202* (2013.01); *H01H 13/88* (2013.01); *C08J 2301/02* (2013.01); *C08J 2367/03* (2013.01); *C08J 2369/00* (2013.01); *C08J 2371/02* (2013.01); *C08K 3/40* (2013.01); *C08K 7/14* (2013.01); *C08L 71/02* (2013.01)

(58) Field of Classification Search
CPC ........ H01H 13/704; H01H 13/88; C08J 11/06; C08J 11/10; C08J 2301/02; C08J 2367/03; C08J 2369/00; C08K 3/40; C08K 7/14; C08L 71/02; G06F 3/033; G06F 3/02; G09G 5/08; G09G 5/00
See application file for complete search history.

(56) References Cited

U.S. PATENT DOCUMENTS

| | | | | |
|---|---|---|---|---|
| 2010/0134964 | A1* | 6/2010 | Smith | H04M 1/04 361/679.02 |
| 2010/0290253 | A1 | 11/2010 | Tsai | |
| 2011/0303521 | A1 | 12/2011 | Niu et al. | |
| 2014/0168936 | A1 | 6/2014 | Chen | |

(Continued)

FOREIGN PATENT DOCUMENTS

| | | |
|---|---|---|
| CN | 110741045 A | 1/2020 |
| EP | 2225319 A1 | 9/2010 |
| TW | M428415 U | 5/2012 |

*Primary Examiner* — Pegeman Karimi
(74) *Attorney, Agent, or Firm* — Norton Rose Fulbright US LLP (57) ABSTRACT

A keyboard having a total recycled and renewable content of equal to or greater than 35 wt. %, based on the total weight of the keyboard is described. The keyboard contains a key cap containing a mechanically recycled polycarbonate polymer or a chemically recycled cellulose based polymer, a pair of cross arms forming a scissor-shaped structure containing a polymeric composition containing 60 wt. % to 100 wt. % of a polyoxymethylene polymer, and 0 wt. % to 40 wt. % of a filler containing glass, and a back light module containing a renewably source polycarbonate polymer or a chemically recycled polyester polymer.

20 Claims, 4 Drawing Sheets

(56) References Cited

U.S. PATENT DOCUMENTS

| | | | |
|---|---|---|---|
| 2014/0367238 A1* | 12/2014 | Chen | H01H 13/83 |
| | | | 200/5 A |
| 2018/0362720 A1* | 12/2018 | Markgraf | C08K 3/40 |
| 2019/0112479 A1* | 4/2019 | Peace | C08L 97/005 |
| 2020/0032040 A1* | 1/2020 | Sanità | C08L 23/06 |
| 2020/0102260 A1* | 4/2020 | Strano | C07C 29/1512 |

* cited by examiner

KEYBOARD CONTAINING RECYCLED AND RENEWABLE POLYMERIC COMPOSITIONS

BACKGROUND OF THE INVENTION

A. Field of the Invention

The invention generally relates to computer keyboards. In particular the invention relates to sustainable keyboards containing compositions having high recycled and/or renewable content while having good mechanical properties.

B. Description of Related Art

Plastics are used in electronic and electrical device parts such as keyboards, due to their light weight and good mechanical properties. However, certain commonly used plastics, (e.g., certain polycarbonates, polyesters, acetals, etc.) are not as biodegradable as other plastics, and if not recycled, can create environmental problems (e.g. landfill contamination, increased use of natural resources and energy, etc.) Thus, efforts have been made to increase recycled content in various articles of manufacture that use plastics (e.g., polycarbonate, polyester and/or acetal based plastics), such as keyboards.

A traditional recycling method includes mechanical recycling. Mechanical recycling typically includes collecting used products or debris having the target polymer (e.g. polycarbonate, polyester, and/or acetal based plastics), optionally washing the used products or debris, melting the used products or debris into a raw material having the target polymer, and reusing the raw material to produce new articles of manufacture. A problem with mechanical recycling is that the mechanical properties (e.g., tensile strength, tensile modulus, etc.) of the recycled plastics (e.g., polycarbonate, polyester, and/or acetal based plastics) can decrease. This decrease in mechanical properties can be caused by the mechanical recycling process (e.g., input of energy during the melting process can lead to polymer chain scissions and lead to weaker polymers). Thus, mechanical properties of an articles of manufacture can decrease (e.g., reduction in ductility) with increasing amounts of mechanically recycled polymer. This can present a significant limit on the amount of recycled material that can be used in articles of manufacture such as keyboards.

A typical solution to counteract the reduced mechanical properties of mechanically recycled polymer is the use of additives and introduction of other materials into the polymer composition. This solution can increase costs associated with the polymer composition, can reduce the sustainability of the polymer composition, and/or can introduce caustic or environmentally unfriendly materials to the polymer composition.

SUMMARY OF THE INVENTION

A discovery has been made that provides a solution to at least one or more of the aforementioned problems. In one aspect of the present invention, the solution can include supplementing mechanically recycled polymers (e.g., mechanically recycled polycarbonates polyesters, and/or acetals) in keyboards with polymers obtained by other recycling methods and/or components made from renewable sources. In particular, it was found that a keyboard having i) keycaps containing a post-consumer mechanical recycled polycarbonate polymer or a chemically recycled and/or renewably sourced cellulose based polymer, ii) scissor shaped structures containing chemically recycled and/or renewably sourced polyoxymethylene polymer, and iii) back light module containing renewably sourced polycarbonate or chemically recycled polyester polymer can have good mechanical properties such as wear resistance, good optical properties, and high recycled and renewable content. Therefore, the keyboard assemblies of the present invention can be a more sustainable option from traditional keyboard assemblies in at least two respects, (1) the use of renewable feed stock and/or chemically recycled material to produce the plastics that can be used in the keyboard assemblies, and/or (2) the use of mechanically recycled materials in the keyboard assemblies. This overall increase in renewable content can be obtained without jeopardizing the mechanical properties of the polymeric resin material used to make the keyboard assemblies of the present invention and/or the mechanical properties of the produced keyboard assemblies of the present invention.

One aspect of the present invention is directed to a computer keyboard, such as desktop computer or a laptop computer keyboard. The keyboard can contain a key cap, a pair of cross arms forming a scissor-shaped structure connecting the key cap to a base plate, and a back light module configured to illuminate when the key cap is pressed down. The scissor-shaped structure can be configured to move the key cap up and down relative to the base plate. The total recycled and renewable content of the keyboard, based on the total weight of the keyboard, can be at least 35 wt. %, preferably 35 wt. % to 60 wt. %.

In some aspects, the key cap can contain a first polycarbonate polymer. At least a portion of the first polycarbonate polymer can be mechanically recycled polymer, e.g., the polycarbonate polymer at least in part can be obtained by mechanical recycling. In some particular aspects, the first polycarbonate polymer can have a mechanically recycled content of 75 wt. % to 100 wt. %. In some aspects, the first polycarbonate polymer can have a density of 1.05 g/cc to 1.35 g/cc 23° C. measured in accordance with ISO 1183, a tensile modulus equal to or greater than 2000 MPa, preferably 2000 MPa to 10000 MPa at 23° C., as measured in accordance with ISO 527, a tensile strength at break equal to or greater than 45 MPa, preferably 45 MPa to 100 MPa at 23° C., as measured in accordance with ISO 527 at test speed of 5 mm/min, and/or a flexural modulus equal to or greater than 2000 MPa at 23° C., preferably 2100 MPa to 10000 MPa at 23° C., as measured in accordance with ISO 178 at test speed of 5 mm/min, or any combinations thereof. In some aspects, the first polycarbonate can have a recycle content of 80 wt. % to 100 wt. %, or 90 wt. % to 100 wt. %, or 95 wt. % to 100 wt. %, or 98 wt. % to 100 wt. %, or 99 wt. % to 100 wt. %, or about 100 wt. %. In some aspects, a portion the polycarbonate in the keycaps can be virgin polycarbonate. In some aspects, less than 5 wt. %, or less than 2 wt. %, or less than 1 wt. %, or less than 0.1 wt. %, of the polycarbonate in the keycaps can be virgin polycarbonate, or the keycaps can be free of, essentially free of virgin polycarbonate.

In some aspects, the key cap can contain a cellulose based polymer. At least a first portion of the cellulose based polymer can be a chemically recycled polymer (e.g., obtained by chemical recycling), and at least a second portion of the cellulose based polymer can be a bio-based renewably sourced cellulose based polymer (e.g., obtained from a first bio-based renewable source). In certain aspects, the cellulose based polymer can have a chemically recycled content of 5 wt. % to 60 wt. % and a renewable sourced content of 35 wt. % to 65 wt. %. In certain aspects, the cellulose based polymer can have a total recycle and a renewable content of 95 wt. % to 100 wt. %. In some aspects, the first portion of the cellulose based polymer can be obtained by chemical recycling of cellulose containing textile waste. The first bio-based renewable source can be plant (e.g., bark, wood, or leaves of plants or any combination thereof) and/or bacteria. In some aspects, the a cellulose based polymer can have a density of 1.05 g/cc to 1.35 g/cc 23° C. measured in accordance with ISO 1183, a tensile modulus equal to or greater than 1500 MPa, preferably 1800 MPa to 10000 MPa at 23° C., as measured in accordance with ISO 527, a tensile strength at break equal to or greater than 35 MPa, preferably 35 MPa to 80 MPa at 23° C., as measured in accordance with ISO 527 at test speed of 5 mm/min, or a flexural modulus equal to greater than 1500 MPa at 23° C., preferably 1500 MPa to 10000 MPa at 23° C., as measured in accordance with ISO 178 at test speed of 5 mm/min; or any combinations thereof.

The scissor-shaped structure of the keyboard assembly can contain a polymeric composition containing a polyoxymethylene (POM) polymer and optionally a filler containing glass. The POM polymer can be produced from bio-based methanol and/or recycled $CO_2$. In some aspects, the recycled $CO_2$ can be obtained from industrial waste $CO_2$. In some aspects, the POM polymer can have a total recycled and renewable content of 60 wt. % to 80 wt. %. In some aspects, the filler can contain glass, preferably glass fibers. In some particular aspects, the polymeric composition can contain 60 wt. % to 100 wt. % or 60 wt. % to 95 wt. % of the POM polymer and 0 wt. % to 40 wt. % or 5 wt. % to 40 wt. % of the filler containing glass, such as glass fibers.

In some aspects, the back light module of the keyboard assemblies can contain a second polycarbonate polymer. In some aspects, the back light module can contain one or more light guides and the second polycarbonate polymer can be comprised in the one or more light guides. The second polycarbonate polymer can be a renewably sourced polycarbonate polymer, produced, at least in part, from a second bio-based renewable source. The second bio-based renewable source can be tall oil, sugar, castor beans, and/or $CO_2$, such as waste $CO_2$. In some particular aspects, the second bio-based renewable source can be tall oil derived from wood pulp. In some aspects, renewable content of the second polycarbonate can be 75 wt. % to 100 wt. %. In some aspects, the second polycarbonate polymer can have a density of 1.05 g/cc to 1.35 g/cc 23° C. measured in accordance with ISO 1183; a tensile modulus equal to or greater than 2000 MPa, preferably 2000 MPa to 10000 MPa at 23° C., as measured in accordance with ISO 527; a tensile strength at break equal to or greater than 45 MPa, preferably 45 MPa to 100 MPa at 23° C., as measured in accordance with ISO 527 at test speed of 5 mm/min; or a flexural modulus equal to or greater than 2000 MPa at 23° C., preferably 2100 MPa to 10000 MPa at 23° C., as measured in accordance with ISO 178 at test speed of 5 mm/min; or any combinations thereof. In some aspects, the second polycarbonate containing light guides can have a transmission equal to or greater than 88% at a thickness of 1 mm measured by ASTM D1003-00. In some aspects, the second polycarbonate can have a renewable content of 40 wt. % to 100 wt. %, or 50 wt. % to 100 wt. %, or 60 wt. % to 100 wt. %, or 70 wt. % to 100 wt. %, or 80 wt. % to 100 wt. %, or 90 wt. % to 100 wt. %, or 95 wt. % to 100 wt. %, or 98 wt. % to 100 wt. %, or 99 wt. % to 100 wt. %, or about 100 wt. %. In some aspects, a portion the polycarbonate in the light guide(s) can be non-renewably polycarbonate. In some aspects, less than 5 wt. %, or less than 2 wt. %, or less than 1 wt. %, or less than 0.1 wt. %, of the polycarbonate in the light guide(s) can be virgin polycarbonate, or the keycaps can be free of, essentially free of virgin polycarbonate.

In some aspects, the back light module of the keyboard assemblies can contain a polyester polymer. In some aspects, the back light module can contain one or more light guides and the polyester polymer can be comprised in the one or more light guides. In some aspects, the polyester can polymer can be an copolyester, such as amorphous copolyester. The polyester can at least in part be a chemically recycled polymer, e.g. obtained by chemical recycling. The chemically recycled polyester polymer can be obtained or derived from terephthalic acid obtained from chemical recycling of polyethylene terephthalate (PET) polymer, such as post-consumer PET polymer. In some aspects, the polyester polymer can have a recycle content of 85 wt. % to 100 wt. %. In some aspects, the polyester polymer, such as the chemically recycled amorphous copolyester, can have a density of 1.05 g/cc to 1.35 g/cc 23° C. measured in accordance with ISO 1183; a tensile modulus equal to or greater than 1200 MPa, preferably 1200 MPa to 8000 MPa at 23° C., as measured in accordance with ISO 527; a tensile strength at break equal to or greater than 45 MPa, preferably 45 MPa to 100 MPa at 23° C., as measured in accordance with ISO 527 at test speed of 5 mm/min; or a flexural modulus equal to or greater than 1200 MPa at 23° C., preferably 1200 MPa to 8000 MPa at 23° C., as measured in accordance with ISO 178 at test speed of 5 mm/min; or any combinations thereof. In some aspects, the co-polyester containing one or more light guides can have a transmission equal to or greater than 90% at a thickness of 1 mm measured by ASTM D1003-00.

In some aspects, i) the key cap can contain the first polycarbonate polymer, ii) the scissor-shaped structure can contain the polymeric composition containing the POM polymer and the filler, and iii) back light module can contain the second polycarbonate polymer. In some aspects, i) the key cap can contain the cellulose based polymer, ii) the scissor-shaped structure can contain the polymeric composition containing the POM polymer and the filler, and iii) the back light module can contain the polyester polymer.

In some aspects, the keyboard assemblies of the present invention, such as the key cap, the scissor-shaped structure, and/or back light module such as light guides(s) of the back light module, independently can further contain one or more additives selected from pigments, plasticizers, antioxidants, UV-stabilizers, heat stabilizers, dye enhancing agents, lubricant, mold release agents, crystal nucleating agents, fluidability-improving agents, antistatic agents, anti-drip agents or any combination thereof.

The keyboard assemblies of the present invention can contain a plurality of the keycaps and a plurality of the scissor shaped structures, wherein each of the keycap can be connected to the base plate of the keyboard through a scissor shaped structure. Each of the keycap may have a symbol imprinted thereon for identifying the input associated with the particular key. In operation, a keyboard assembly of the present invention can be configured to receive a discrete input at each keycap using a finger motion usually referred to as keystrokes. The keystrokes may be converted to electrical signals that are passed to a processing unit of a computer the keyboard is connected to (via wire or wireless connection) for evaluation and/or control. The back light module can be configured to illuminate when one or more of the keycaps are pressed, e.g. with keystrokes.

In some aspects, the light guide(s) of an example keyboard of the present invention can have better optical properties, such as higher transmission %, compared to a light guides of a substantially identical reference keyboard containing mechanically recycled polymer in the light guide(s) instead of the renewably sourced second polycarbonate polymer or chemically recycled polyester polymer. As used herein substantially identical reference keyboard is a keyboard that includes the same components, and the same amounts of the components, as the example keyboard, except that the reference keyboard does not include the recited component. Thus, if an example keyboard contains key caps containing a first polycarbonate polymer, scissor-shaped structures containing a polymeric composition containing 80 wt. % of a POM polymer and 20 wt. % of glass fibers; and a back light module (e.g. light guide(s) of back light module) containing the second polycarbonate polymer, the substantially identical reference keyboard would contain key caps containing the first polycarbonate polymer, scissor-shaped structures containing the polymeric composition containing 80 wt. % of the POM polymer and 20 wt. % of glass fibers, and a back light module (e.g. light guide(s) of back light module) containing a mechanically recycled polycarbonate polymer, where the total recycle and renewable content of the example keyboard is same as the total recycle content of the reference keyboard. Also, if an example keyboard contains key caps containing a cellulose polymer, scissor-shaped structures containing a polymeric composition containing 80 wt. % of a POM polymer and 20 wt. % of glass fibers, and a back light module (e.g. light guide(s) of back light module) containing a chemically recycled copolyester polymer, the substantially identical reference keyboard would contain key caps containing the first polycarbonate polymer, scissor-shaped structures containing the polymeric composition containing 80 wt. % of the POM polymer and 20 wt. % of glass fibers, and a back light module (e.g. light guide(s) of back light module) containing a mechanically recycled copolyester polymer, where the total recycle and renewable content of the example keyboard is same as the total recycle content of the reference keyboard.

One aspect is directed to a polymeric resin composition containing 60 wt. % to 95 wt. % of a POM polymer and 5 wt. % to 40 wt. % of a filler containing glass. The POM can be produced from bio-based methanol and/or recycled $CO_2$ such as $CO_2$ from industrial waste. In some aspects, the POM can have a total recycled and renewable content of 60 wt. % to 80 wt. %. In some aspects, the filler can contain glass fiber. In some aspects, the polymeric composition can further contain one or more additives selected from flame retardants, pigments, plasticizers, antioxidants, UV-stabilizers, heat stabilizers, dye enhancing agents, lubricant, mold release agents, crystal nucleating agents, fluidability-improving agents, antistatic agents, anti-drip agents or any combination thereof. The polymeric composition can have any one of, any combination of, or all of the following properties: a density 1.45 of 1.75 g/cc at 23° C. measured with ISO 1183; a tensile modulus equal to or greater than 2740 MPa, preferably 4700 MPa to 15000 MPa at 23° C., as measured in accordance with ISO 527 at 5 mm/min; a tensile strength at break equal to or greater than 90 MPa, preferably 90 MPa to 200 MPa at 23° C., as measured in accordance with ASTM D638 at 5 mm/min; a tensile elongation at break equal to or greater than 2.8%, at 23° C., as measured in accordance with ASTM D638 at test speed of 5 mm/min; and a flexural modulus equal to or greater than 2500 MPa at 23° C., preferably 4000 MPa to 14000 MPa at 23° C., as measured in accordance with ASTM D790 at test speed of 2 mm/min. In some aspects, the polymeric composition can be comprised in a film, layer, or a sheet. In some aspects, the polymeric composition can be an extrusion molded, blow-molded, injection-molded, rotational molded, compression molded, 3-D printed, and/or thermoformed composition. In some aspects, the polymeric composition can be comprised in an article of manufacture. In some aspects, the article can be a computer part. In some aspects, the computer part can be a keyboard. In some particular aspects, the article can be a pair of cross arms forming a scissor-shaped structure that is configured to connect a key cap to a base plate of a keyboard. The polymeric resin composition and/or article of manufacture containing the polymeric resin composition can have relatively low coefficient of friction and low wear factor.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

As used herein, recycle content of a material refers to wt. % of the material obtained from, made from, and/or recovered from waste. Unless mentioned otherwise the waste can be post-industrial and post-consumer waste. Post-consumer waste of a material can include waste generated by a customer of a substrate containing the material. Post-industrial waste can include waste generated during a production process of a product and has not been used in the consumer market. Recycled content can be from mechanically and/or chemically recycling processes.

As used herein, renewable content of a material refers to wt. % of the material obtained from or made from a bio-based renewable material. Unless mentioned otherwise, bio-based material can include materials from any life form such as plants, animals, fungi, protists, prokaryotes, microbes, algae, bacteria, yeasts and/or moulds. The bio-based material can be obtained from natural or genetically engineered species. Non-limiting examples of bio-based renewable material includes tall oil, sugar, castor beans, and/or $CO_2$, such as waste $CO_2$.

As used herein total recycled and renewable content of a material refers to wt. % of the material obtained from, made from and/or recovered from waste and wt. % of the material obtained from or made from a bio-based renewable material. For example for a 100 gm material is 10 gm is obtained recycled sourced and 10 gm is obtained from renewable source, the total recycled and renewable content of the material is 20 wt. %.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm"

refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The keyboard assemblies of the present invention can "comprise," "consist(s) essentially of," or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include the keyboard assemblies having (1) high recycle and renewable content and/or (2) good wear resistance and optical properties.

All publications mentioned herein are incorporated herein by reference to disclose and describe the methods and/or materials in connection with which the publications are cited.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

FIG. 4A shows the key assembly in an up-position (resting position), and FIG. 4B shows the key assembly when the keycap is pushed down.

DETAILED DESCRIPTION OF THE INVENTION

A discovery has been made that provides a solution to at least one or more of the problems that may be associated with increasing recycle content in a computer keyboard without detrimentally jeopardizing the mechanical properties of the keyboard. In one aspect, the discovery can include supplementing mechanically recycled polymers in keyboards with polymers obtained by other recycling methods and/or from renewable sources. In particular, it was found that a keyboard containing i) keycaps containing a post-consumer mechanical recycled polycarbonate polymer and/or a chemically recycled and/or renewably sourced cellulose based polymer, ii) scissor shaped structures containing chemically recycled and/or renewably sourced polyoxymethylene polymer, and iii) a back light module containing renewably sourced polycarbonate or chemically recycled polyester polymer can have good mechanical properties, such as wear resistance and optical properties, and high recycle and renewable content. Notably, the high recycle and renewable content of the key boards of the present invention can lead to a more sustainable or "green" article of manufacture without comprising costs and/or mechanical strength of the keyboards.

Figure 1:
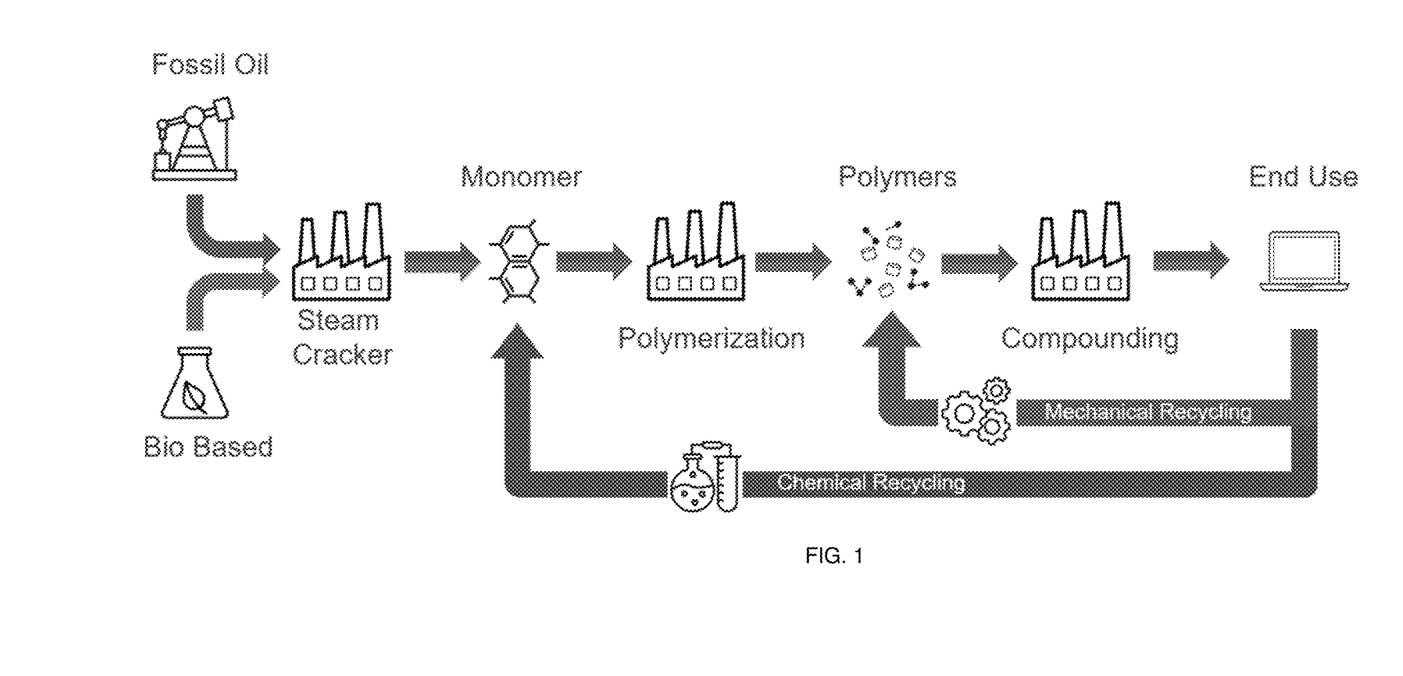
FIG. 1 illustrates a schematic of various polymer recycling methods.

Referring to FIG. 1, a schematic of polymer plastics recycling methods is provided. Polymers (e.g., polycarbonate, polyester, and/or acetal) derived from fossil oil can be used to form various articles of manufacture (e.g., consumer products, such as keyboard), which after use can become waste. Polymers are primarily recycled from the waste through mechanical recycling. In mechanical recycling, the waste is recycled through physical processes where the polymer chains are not reduced into monomer units forming the polymer. Rather, mechanical recycling typically includes collecting the waste having the target polymer (e.g., polycarbonate, polyester, and/or acetal based plastics), optionally washing the waste, melting the waste into a raw material having the target polymer, and reusing the raw material to produce new articles of manufacture. However, the mechanical properties of the mechanically recycled polymer can decrease due to the heat used in melting. The heat can weaken the molecular chains of the polymers. Polymers can also be recycled from waste by chemical recycling. In chemical recycling the polymers from the waste is depolymerized into the monomer units and the monomer units are re-polymerized to form the chemically recycled polymer. Further, polymers formed from bio-based chemicals can be also used to form the articles of manufacture increasing the renewable content of the articles. In certain aspects of the present invention, recycled and renewable content of a keyboard is increased while maintaining the desired mechanical properties of the keyboard by supplementing mechanical recycled polymers (e.g., polycarbonate, polyester, and/or acetal) with chemically recycled and/or renewably sourced polymers. As illustrated in a non-limiting manner in the Examples, keyboards of the present invention can have good mechanical properties and high recycle and renewable content.

These and other non-limiting aspects of the present invention are discussed in further detail in the following sections.

A. Keyboard

Figure 2A:
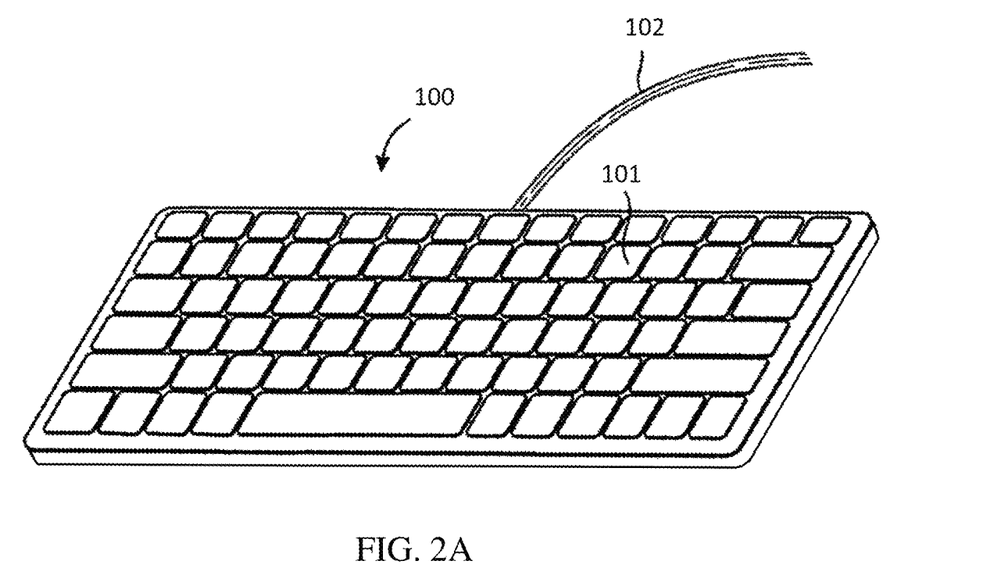
FIGS. 2A and 2B schematic of an external keyboard (FIG. 2A) and a laptop keyboard (FIG. 2B), according to some examples of the present invention.
Figure 2B:
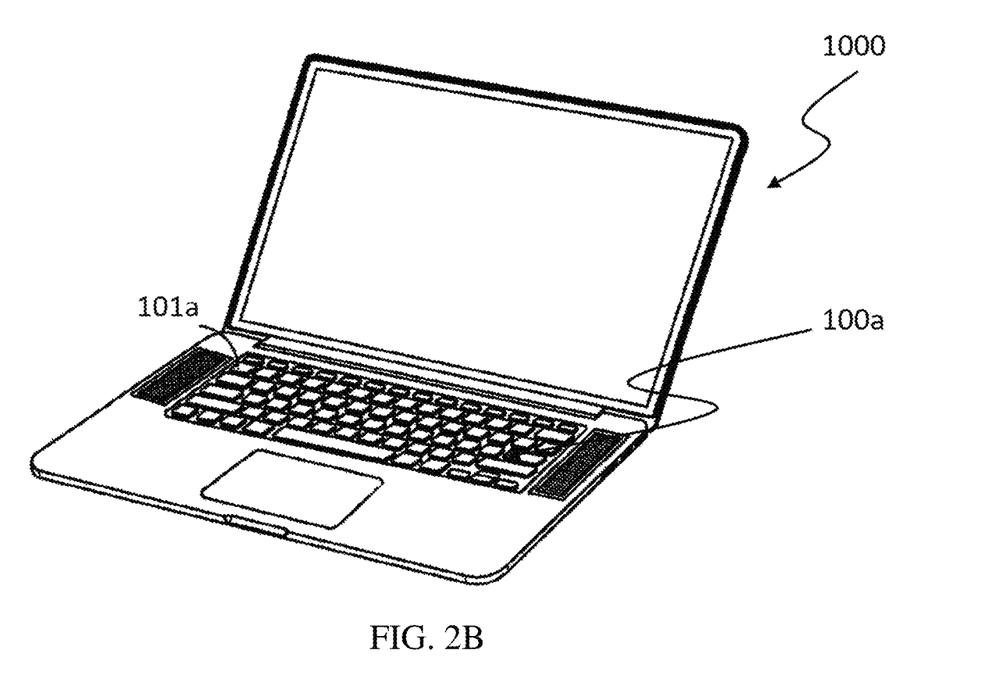

Referring to FIG. 2A, a schematic of a computer keyboard 100 according to one example is shown. The keyboard 100 can include a plurality of key assemblies 101 each having a keycap and a scissor shaped structure (see FIG. 4). Each keycap 101 can have a symbol imprinted thereon for identifying the key input associated with the particular key. In operation, keyboard 100 can be configured to receive a discrete input at each key using a finger motion usually referred to as keystrokes. Keystrokes may be converted to electrical signals that are passed to a processing unit of a computer for evaluation and/or control. In some aspects, the keyboard 101 can include a cable 102 that interfaces electronic components within the keyboard 100 with processing elements of a computer. For example, inputs made at key 101 may be communicated through keyboard cable 102 for use by processor(s) of a computer. In other cases, however, keyboard 100 may be coupled to a computer wirelessly, for instance, over a Bluetooth communication channel between keyboard 100 and the computer. The keyboard can be an external keyboard of a device (e.g. keyboard of a desktop computer) or an internal keyboard of a device (laptop keyboard of a laptop). Non-limiting examples of the device includes desktop computer, laptop computer, notebook computer, cell phone, computer tablet, calculator or the like. Referring to FIG. 2B, a schematic of a laptop computer 1000 with an internal keyboard 100a according to an example is shown. The keyboard 100a can include a plurality of key assemblies 101a each having a keycap and a scissor shaped structure (FIG. 4).

Figure 3:
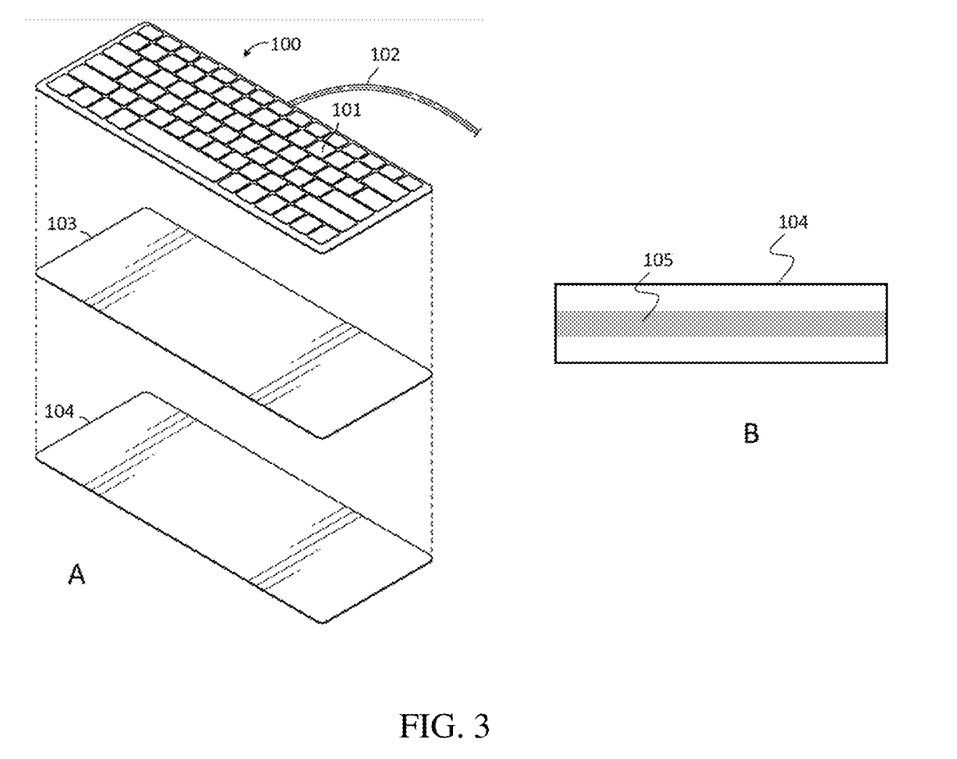
FIG. 3A an exploded view of the keyboard of FIG. 2A.
FIG. 3B a side cross-sectional view of the backlight module of the keyboard of FIG. 2A.

FIG. 3A is an exploded view of the keyboard 100. In addition to the keys 101 (extending out of an upper surface to provide selectable inputs based upon the characters associated with the keys, such as a QWERTY keyboard that provides ASCI binary code), keyboard 100 can also include an electromechanical layer 103 having a base plate, and electronic circuits. A person skilled in the art will recognize in light of this disclosure, the electromechanical layer 103 may have a variety of structure necessary for the operation of the keyboard 100 as an input device. The keyboard can further have a backlight module 104. In some aspects, the backlight module 104 can contain a flexible printed circuit (FPC), light emitting diodes connected to the FPC, and one or more light guides 105, forming one or more optical channels through which light from the diodes can travel. FIG. 3B shows a cross-sectional view of the backlight module 104. In some aspects, light guides 105 can form a layer (e.g. sheet/film) within the backlight module 104.

Figure 4:
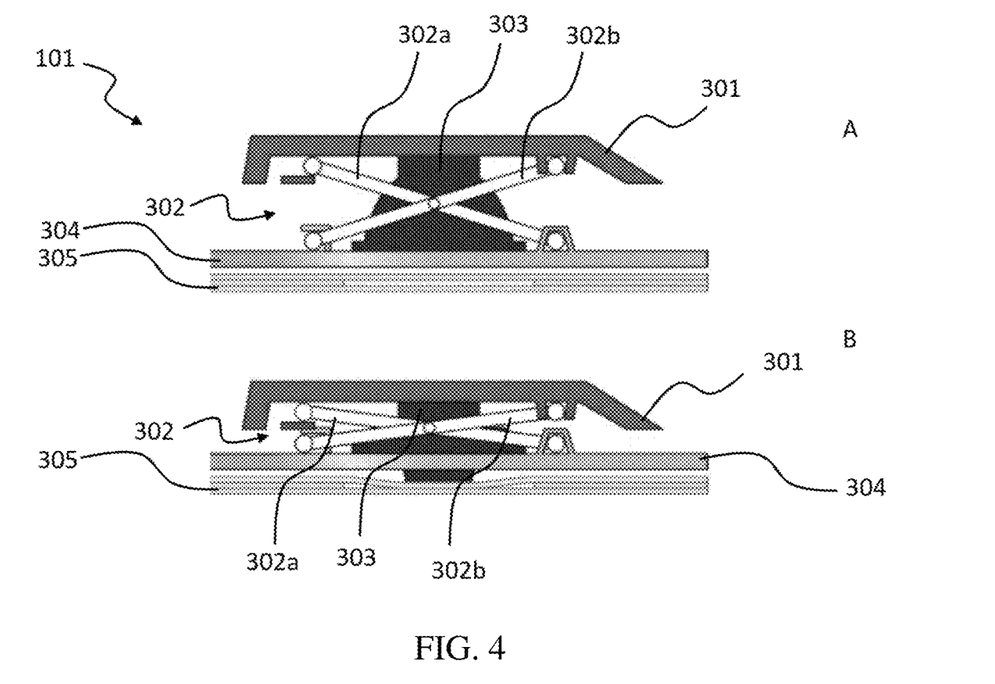
FIG. 4 a schematic of a key assembly containing a key cap and a scissor shaped structure according to an example of the present invention.

Referring to FIG. 4, a key assembly 101 according to one example is shown. The key assembly 101 can include a key cap 301, a scissor-shaped structure 302 and an elastic body 303. A pair of cross arms (302a-b) can form the scissor shaped structure 302. The scissor shaped structure 302 can connect the key cap 301 to a base plate 304 (not a part of the key assembly 300) of an electromagnetic layer (e.g., 103 of FIG. 3). The elastic body 303 can transfer pressure applied on the key cap 301 via keystrokes to the electronic circuit 305 (not a part of the key assembly 300) of the electromagnetic layer (e.g. 103 of FIG. 3), converting the keystrokes to electronic signal, which are passed to a processing unit of a computer for evaluation and/or control. The elastic body 303 can also transfer the pressure applied on the keycap 301 via keystrokes to the back light module (e.g., 104 of FIG. 3) illuminating the back light module. FIG. 4A shows the key assembly 101 at an up-position (resting position), and FIG. 4B shows the key assembly 101 when the key cap 301 is pushed down (e.g., via pressure applied through keystrokes).

The structure of the keyboard, arrangement and structure of the key caps, scissor shaped structure, and back light module in the keyboard can be according to a keyboard known in the art. Although FIG. 3A shows the backlight module is arranged below the electronic circuit layer of the electromechanical layer, keyboards having backlight module arranged above the electronic circuit layer of the electromechanical layer, e.g. with backlight module positioned between the keycaps and the electronic circuit layer of the electromechanical layer can also be readily made.

1. Key Caps

In certain aspects, the key cap 301 can contain a first polycarbonate polymer. The first polycarbonate polymer can have carbonate units having the formula of formula (1)

$R^1$ groups can contain aliphatic or aromatic groups. The carbonate units can be derived from sugars, hydroxy containing aliphatic groups and/or hydroxy aromatic groups. In certain aspects, the carbonate units can be derived from bisphenol A (BPA), e.g. carbonate units having the formula of formula (2)

The first polycarbonate can be a polycarbonate homopolymer and/or co-polymer. In polycarbonate homo-polymer each $R^1$ group in the polymer can be the same. The polycarbonate copolymers can be polycarbonate containing different $R^1$ groups or polymers containing carbonate units (having same or different $R^1$), and other types of polymer units, such as ester units.

The first polycarbonate polymer can be a post-consumer mechanical recycled polycarbonate, which at least in part, be obtained by mechanical recycling of post-consumer polycarbonate waste. The post-consumer polycarbonate waste can be mechanically recycled by any suitable mechanical recycling method known in the art. Mechanical recycling of a polymer refers to recycling of the polymer from a waste material containing the polymer through physical processes where the polymers chains are not broken (e.g. chemically depolymerized) into the monomers units forming the polymer. In some aspects, the mechanical recycling can include the steps of grinding, washing, separating, drying, re-granulating and compounding, wherein each of the steps can occur 0 to multiple times. In some aspects, the mechanically recycled content in the post-consumer mechanical recycled polycarbonate can be, or the post-consumer mechanical recycled polycarbonate can have a recycle content of 75% to 100%, or at least any one of, equal to any one of, or between any two of, 75, 80, 85, 90, 95 and 100%, with the remaining optionally being virgin polycarbonate.

In certain aspects, post-consumer mechanical recycled polycarbonate can contain carbonate units derived from bisphenol A (BPA), (e.g. carbonate units having the formula of formula (2)). In certain aspects, post-consumer mechanical recycled polycarbonate can contain homo-polymer(s) containing carbonate units derived from BPA. In certain aspects, post-consumer mechanical recycled polycarbonate can contain co-polymer(s) containing carbonate units derived from BPA and/or other carbonate units, and/or other types of polymer units. In some aspects, post-consumer mechanical recycled polycarbonate can include a combination of polycarbonate polymers. In some aspects, at least 90 wt. %, or at least 95 wt. %, or at least 98 wt. %, or at least 99 wt. %, or about 100 wt. % of the key caps 301 can be comprised of the first polycarbonate polymer. In some aspects, the post-consumer mechanical recycled polycarbonate can be a homo-polymer containing carbonate units derived from BPA.

In some aspects, the first polycarbonate polymer can be present in the key caps 301 comprised in a composition. In some aspects, the first polycarbonate polymer and/or composition containing the first polycarbonate polymer can have a density of 1.05 g/cc to 1.35 g/cc, or at least any one of, equal to any one of, or between any two of, 1.05, 1.1, 1.15, 1.2, 1.25, 1.3 and 1.35 g/cc at 23° C., measured in accordance with ISO 1183; a tensile modulus equal to or greater than 2000 MPa, preferably 2000 MPa to 10000 MPa, or at least any one of, equal to any one of, or between any two of, 2000, 3000, 4000, 5000, 6000, 7000, 8000, 9000, and 10000 MPa, at 23° C., as measured in accordance with ISO 527; a tensile strength at break equal to or greater than 45 MPa, preferably 45 MPa to 100 MPa, or at least any one of, equal to any one of, or between any two of, 45, 50, 60, 70, 80, 90 and 100 MPa at 23° C., as measured in accordance with ISO 527 at test speed of 5 mm/min; or a flexural modulus equal to or greater than 2000 MPa at 23° C., preferably 2100 MPa to 10000 MPa, or at least any one of, equal to any one of, or between any two of, 2000, 2100, 3000, 4000, 5000, 6000, 7000, 8000, 9000, and 10000 MPa at 23° C., as measured in accordance with ISO 178 at test speed of 5 mm/min; or any combinations thereof. Non-limiting examples of commercially available polycarbonates that can be used includes TRINSEO EMERGE 4330E7 available from Trinseo.

In certain aspects, the key caps 301 can contain a cellulose based polymer. At least a first portion of the cellulose based polymer can be a chemically recycled polymer (e.g., obtained by chemical recycling and at least a second portion of the cellulose based polymer can be obtained from a first bio-based renewable source). In certain aspects, the cellulose based polymer can have a chemically recycled content of 5 wt. % to 60 wt. % and a renewable content of 35 wt. % to 65 wt. %. In some aspects, the cellulose based polymer can have a total recycle or renewable content 95% to 100%, or at least any one of, equal to any one of, or between any two of, 95, 96, 97, 98, 99 and 100%, with the remaining optionally being virgin polycarbonate. In some aspects, the first portion of the cellulose based polymer can be obtained by chemical recycling of textiles waste. The first bio-based renewable source can be plant (e.g., bark, wood, or leaves of plants) and/or bacteria. In some aspects, the chemical recycling of textile waste can include depolymerizing fibers (e.g., cellulose fibers) from the waste to form monomers, and re-polymerizing the monomers to form regenerated cellulose fibers. The waste can be post-industrial or post-consumer waste. In some aspects, the waste can be post-consumer waste. The textile waste can be cellulose containing textile waste such as cotton, jute, hemp and linen. Textile can include but is not limited to cloths, carpets, rugs, bags, furniture upholstery, vehicle (e.g. car, train, bus, plane, boat or the like) upholstery, covers or the like. Cellulose in the textile waste can be natural or synthetic cellulose. Regenerated/recycled cellulose can include viscose, rayon, modal and/or lyocell. In some particular aspects, chemical recycling of textile waste can include producing viscose from cotton waste. Cotton waste can be depolymerized into pulp and the pulp can be converted to viscose. The chemical recycling of textiles waste can include but are not limited to cellulose recycling methods as described in US20200199257A1, CN1080779C, US 2019/0338466, CN105765116B, CN105765116B, EP1900860B1, all of which are incorporated herein by reference. In some aspects, at least 90 wt. %, or at least 95 wt. %, or at least 98 wt. %, or at least 99 wt. %, or about 100 wt. % of the key caps can be comprised of the cellulose based polymer.

In some aspects, the cellulose based polymer can be present in the key caps 301 comprised in a composition. In some aspects, the cellulose based polymer and/or the composition containing the cellulose based polymer can have a density of 1.05 g/cc to 1.35 g/cc, or at least any one of, equal to any one of, or between any two of, 1.05, 1.1, 1.15, 1.2, 1.25, 1.3 and 1.35 g/cc at 23° C., measured in accordance with ISO 1183; a tensile modulus equal to or greater than 1500 MPa, preferably 1800 MPa to 10000 MPa, or at least any one of, equal to any one of, or between any two of, 1800, 2000, 3000, 4000, 5000, 6000, 7000, 8000, 9000, and 10000 MPa, at 23° C., as measured in accordance with ISO 527; a tensile strength at break equal to or greater than 35 MPa, preferably 35 MPa to 80 MPa, or at least any one of, equal to any one of, or between any two of, 35, 45, 50, 60, 70, and 80 100 MPa at 23° C., as measured in accordance with ISO 527 at test speed of 5 mm/min; or a flexural modulus equal to or greater than 1500 MPa at 23° C., preferably 1500 MPa to 10000 MPa, or at least any one of, equal to any one of, or between any two of, 1500, 2000, 3000, 4000, 5000, 6000, 7000, 8000, 9000, and 10000 MPa at 23° C., as measured in accordance with ISO 178 at test speed of 5 mm/min; or any combinations thereof. Non-limiting examples of commercially available cellulose based polymers that can be used includes EASTMAN TREVA™ available from Eastman Chemical Company.

2. Scissor-Shaped Structure

The scissor-shaped structure 302 can contain a polymeric composition containing i) 60 wt. % to 100 wt. %, or 60 wt. % to 95 wt. %, or 80 wt. % to 90 wt. %, or at least any one of, equal to any one of, or between any two of 60, 65, 70, 75, 80, 85, 90, 95 and 100 wt. % of a polyoxymethylene (POM) polymer and ii) 0 wt. % to 40 wt. %, or 5 wt. % to 40 wt. %, or 10 wt. % to 20 wt. %, or at least any one of, equal to any one of, or between any two of 0, 0.1, 5, 10, 15, 20, 25, 30, 35 and 40 wt. % of a filler containing glass. In some aspects, 60 wt. % to 100 wt. %, or at least any one of, equal to any one of, or between any two of 60, 70, 80, 90, 95, 98, 99 and 100 wt. % of the scissor-shaped structure can be comprised of the polymeric composition.

The polyoxymethylene (POM) polymer can be a polyacetal polymer. The POM polymer used in the scissor-shaped structure 302 can be any suitable POM polymer. The POM polymer can include repeating units having the chemical formula of —$CH_2O$— (oxymethylene units). The POM polymer can contain oxymethylene homopolymer and/or oxymethylene copolymer. In some aspects, the POM polymer can include greater than 50 mol. %, greater than 60 mol. %, greater than 70 mol. %, greater than 80 mol. %, greater than 90 mol. %, greater than 99 mol. %, of oxymethylene units. In some aspects, the POM copolymer can include oxymethylene units and about 1 mol. % to 10 mol. %, or 1 mol. % to 20 mol. %, or 1 mol. % to 30 mol. %, or 1 mol. % to 40 mol. %, of monomer units having two or more adjacent carbon atoms. The POM polymer can have any suitable end groups.

The POM polymer can be produced from bio-based methanol and/or recycled $CO_2$. The recycled $CO_2$ can be obtained from industrial waste. The POM polymer can be produced from the methanol and/or $CO_2$ by methods known in the art. In some particular aspects, formaldehyde and/or its cyclic oligomers (such as trioxane and/or 1,3,5,7-tetraoxacyclooctane) can be produce from the methanol and/or $CO_2$, and the formaldehyde and/or its cyclic oligomers can be polymerized to form POM. The POM polymer can have a total recycle and renewable content of 40 wt. % to 80 wt. %, or 40 wt. % to 70 wt. %, or 60 wt. % to 80 wt. %, or at least any one of, equal to any one of, or between any two of 40, 50, 60, 65, 70, 75, and 80 wt. %.

The filler can contain glass, preferably glass fiber. The fibers can be long fibers or short fibers that are continuous, chopped, woven, or the like. The short fibers refers to a population of fibers having an average fiber length of less than or equal to 5 mm. The long fibers refers to a population of fibers having an average fiber length greater than 5 mm, including for example, a population of fibers having a fiber length in the range of 5 to 20 mm, or 5 to 15 mm. The fibers can have a length from 0.2 to 20 mm, or 0.2 to 10 mm, or 0.7 to 7 mm. The average diameter of the fibers can be from 1 to 25 micrometers (μm), or 3 to 20 μm, or 4 to 18 μm, or 5 to 17 μm. In some aspects, the glass fibers can include a plurality of chopped glass fibers. The term "glass" refers to a material, natural or synthetic, which contains silicon dioxide ($SiO_2$) or silica as its main material. The glass fibers may be textile glass fibers such as E, A, C, ECR, R, S, D, and/or NE glass fibers, and are desirably E type glass fibers. The glass fibers can be sized or non-sized. The fibers can be sized using any suitable sizing agent. The fibers can be provided in the form of monofilament or multifilament fibers and can be used either alone or in combination with other types of fiber, for example, co-weaving or core/sheath, side-by-side, skin-core type or matrix and fibril constructions, or by other methods including those known to one skilled in the art of fiber manufacture. Exemplary co-woven structures include, for example, glass fiber-carbon or the like. Fibers can be supplied in the form of, for example, bundles, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In certain aspects, the polymeric composition can further contain one or more additives selected from the group pigments, plasticizers, antioxidants, UV-stabilizers, heat stabilizers, dye enhancing agents, lubricant, mold release agents, crystal nucleating agents, fluidability-improving agents, antistatic agents, and anti-drip agents. In certain aspects, the polymeric composition can contain pigments and plasticizer.

In some aspects, the polymeric composition can have any one, any combination of, or all of the following properties: a density of 1.45 g/cc to 1.75 g/cc, or at least any one of, equal to any one of, or between any two of, 1.45, 1.5, 1.55, 1.6, 1.65, 1.7 and 1.75 g/cc at 23° C., measured in accordance with ISO 1183; a tensile modulus greater than 2740 MPa, preferably 4700 MPa to 15000 MPa, or at least any one of, equal to any one of, or between any two of, 2750, 3000, 4000, 4700, 5000, 6000, 7000, 8000, 9000, 10000, 11000, 12000, 13000, 14000, and 15000 MPa, at 23° C., as measured in accordance with ISO 527; a tensile strength at break equal to or greater than 90 MPa, preferably 100 MPa to 200 MPa, or at least any one of, equal to any one of, or between any two of, 90, 100, 110, 120, 130, 140, 150, 160, 170, 180, 190 and 200 MPa at 23° C., as measured in accordance with ISO 527 at test speed of 5 mm/min; a tensile elongation at break equal to greater than 1.5%, or >2, or >3%, as measured in accordance with ASTM D638 at 5 mm/min, or a flexural modulus equal to or greater than 2500 MPa at 23° C., preferably 4000 MPa to 14000 MPa, or at least any one of, equal to any one of, or between any two of 2500, 3000, 4000, 4700, 5000, 6000, 7000, 8000, 9000, 10000, 11000, 12000, 13000, and 14000 MPa at 23° C., as measured in accordance with ISO 178 at test speed of 5 mm/min.

The polymeric compositions can be made by various methods known in the art such as extrusion, injection molding, compression molding, blow molding, rotational molding, thermoforming, 3-D printing or any combination thereof. For example the components, such as the POM polymer and filler can be mixed together and then melt-blended to form the polymeric composition. In some aspects, the components of the polymeric composition can be dry blended with each other, then fed into an extruder from one or multi-feeders, or separately fed into an extruder from one or multi-feeders. The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing. The extruder can generally be operated at a temperature higher than that necessary to cause the composition to melt and flow. In some aspects, the temperature of the melt in the extruder barrel can be maintained as low as possible in order to avoid excessive thermal degradation of the components. The melted composition exits extruder through small exit holes in a die. The extrudate can be quenched in a water bath and pelletized. The pellets so prepared can be of any desired length (e.g., one-fourth inch long or less). Such pellets can be used for subsequent molding, shaping, or forming. Mixtures including any combination of the foregoing mentioned components may be subjected to multiple blending and forming steps if desirable. For example, the polymeric composition may first be extruded and formed into pellets. The pellets may then be fed into a molding machine where it may be formed into any desirable shape or product. In some aspects, the thermoplastic composition emanating from a single melt blender may be formed into sheets or strands and subjected to post-extrusion processes such as annealing, uniaxial or biaxial orientation.

3. Back Light Module

In some aspects, the one or more light guides of the back light module 104 can contain a second polycarbonate polymer. The second polycarbonate polymer can contain carbonate units having the formula of formula (1). The $R^1$ groups of the second polycarbonate polymer and the first polycarbonate polymer can be same or different. The second polycarbonate polymer can be a renewably sourced polycarbonate polymer, produced, at least in part, from a second bio-based renewable source. The renewably sourced polycarbonate can be a suitable polycarbonate known in the art. The renewably sourced polycarbonate can include polycarbonate homo-polymer and/or co-polymer. In some aspects, the renewably sourced polycarbonate can be a homo-polymer containing carbonate units derived from BPA (e.g. carbonate units having the formula of formula (2)). In certain aspects, the second bio-based renewable source can be tall oil, sugar, castor beans, and/or $CO_2$, such as waste $CO_2$. In some aspects, the renewably sourced polycarbonate can contain carbonate units derived from sugar. In some aspects, the renewably sourced polycarbonate can be obtained by reacting sugar with $CO_2$. Non-limiting examples of the sugar includes ribose, glucose, mannose and/or xylose. In some aspects, at least a portion of the $CO_2$ can be obtained from industrial waste. In some aspects, the sugar can be a sugar moiety in a thymidine group and/or a thymidine derivative. In some aspects, the renewably sourced polycarbonate can be a polycarbonate-polyester copolymer containing ester units derived from sebacic acid. In some aspects, the renewably sourced polycarbonate can be a polycarbonate-polyester copolymer containing ester units derived from sebacic acid and carbonate units derived from BPA. The sebacic acid can be obtained from castor beans. In some aspects, the renewably sourced polycarbonate can be obtained from feed stock obtained from tall oil from wood pulp. In some aspects, the renewably sourced polycarbonate can contain carbonate units derived from BPA, where the BPA is obtained from feed stock obtained from tall oil from wood pulp. In some aspects, the renewably sourced polycarbonate can be a homo-polymer containing carbonate units derived from BPA, where the BPA is obtained from feed stock obtained from tall oil from wood pulp. In some aspects, the renewably sourced polycarbonate can obtained from phenol and acetone, wherein the phenol, and/or acetone, can be at least in part obtained independently from the second bio-based renewable source(s). In some aspects, the renewably sourced polycarbonate can be a BPA polycarbonate homo-polymer obtained from phenol and acetone, wherein the phenol, and/or acetone, can be at least in part obtained independently from second bio-based renewable source(s). In some aspects, at least a portion of the carbons in the renewably sourced polycarbonate can be derived from the renewable feed stock. In some aspects, at least a portion of the oxygens and/or hydrogens in the renewable source polycarbonate can be derived from non-renewable sources. In some aspects, at least 70%, or at least 80%, or at least 90%, or at least 95%, or 100% of the carbons in the renewably sourced polycarbonate can be derived from the renewable feed stock. In some aspects, 40% to 100%, or at least any one of, equal to any one of, or between any two of, 40, 50, 60, 70, 75, 80, 85, 90, 95 and 100%, of the renewably sourced polycarbonate can be produced from the second bio-based renewable source. In some aspects, the renewably sourced polycarbonate can include a combination of polycarbonate polymers.

In some aspects, the second polycarbonate polymer can be present in the light guide(s) comprised in a composition. In some aspects, the second polycarbonate polymer and/or the composition containing the second polycarbonate polymer can have any one of, any combination of, or all of the following properties: a density of 1.05 g/cc to 1.35 g/cc, or at least any one of, equal to any one of, or between any two of, 1.05, 1.1, 1.15, 1.2, 1.25, 1.3 and 1.35 g/cc at 23° C., measured in accordance with ISO 1183; a tensile modulus equal to or greater than 2000 MPa, preferably 2000 MPa to 10000 MPa, or at least any one of, equal to any one of, or between any two of, 2000, 3000, 4000, 5000, 6000, 7000, 8000, 9000, and 10000 MPa, at 23° C., as measured in accordance with ISO 527; a tensile strength at break equal to or greater than 45 MPa, preferably 45 MPa to 100 MPa, or at least any one of, equal to any one of, or between any two of, 45, 50, 60, 70, 80, 90 and 100 MPa at 23° C., as measured in accordance with ISO 527 at test speed of 5 mm/min; or a flexural modulus equal to or greater than 2000 MPa at 23° C., preferably 2100 MPa to 10000 MPa, or at least any one of, equal to any one of, or between any two of, 2000, 2100, 3000, 4000, 5000, 6000, 7000, 8000, 9000, and 10000 MPa at 23° C., as measured in accordance with ISO 178 at test speed of 5 mm/min. In some aspects, at least 90 wt. %, or at least 95 wt. %, or at least 98 wt. %, or at least 99 wt. %, or about 100 wt. % of the back light module can be comprised of the second polycarbonate polymer e.g. of the renewably sourced polycarbonate polymer.

In some aspects, the one or more light guides of the back light module 104 can contain a polyester polymer. The polyester polymer can include repeating ester units. In some aspects, the ester units can be terephthalic acid ester units. In certain aspects, the polyester can be an amorphous copolyester polymer. In some aspects, the amorphous copolyester polymer can contain terephthalic acid ester units. The terephthalic acid ester units can be obtained from terephthalic acid obtained by chemical recycling of PET containing waste. The PET from waste can be depolymerized to form the terephthalic acid. PET can be depolymerized by methods known in the art. Non-limiting examples of PET waste includes post-consumer plastic bottles waste, textile waste, or like containing PET. In certain aspects, the PET waste can be PET containing Ocean-Bound-Plastic waste. Ocean-Bound-Plastic waste refers to plastic waste that is in risk of ending up in the oceans. In some aspects, the polyester polymer, such as the amorphous copolyester polymer, can have a renewable content of 85% to 100%, or at least any one of, equal to any one of, or between any two of 85, 90, 95 and 100%. In some aspects, at least 90 wt. %, or at least 95 wt. %, or at least 98 wt. %, or at least 99 wt. %, or about 100 wt. % of the back light module can be comprised of the polyester polymer. In certain aspect the polyester polymer can be present in the light guide(s) comprised in a composition. In some aspects, the polyester polymer and/or composition comprising the polyester polymer can have a density of 1.05 g/cc to 1.35 g/cc, or at least any one of, equal to any one of, or between any two of, 1.05, 1.1, 1.15, 1.2, 1.25, 1.3 and 1.35 g/cc at 23° C., measured in accordance with ISO 1183; a tensile modulus equal to or greater than 1200 MPa, preferably 1200 MPa to 8000 MPa, or at least any one of, equal to any one of, or between any two of, 1200, 2000, 3000, 4000, 5000, 6000, 7000, and 8000, MPa, at 23° C., as measured in accordance with ISO 527; a tensile strength at break equal to or greater than 45 MPa, preferably 45 MPa to 100 MPa, or at least any one of, equal to any one of, or between any two of, 45, 50, 60, 70, 80, 90 and 100 MPa at 23° C., as measured in accordance with ISO 527 at test speed of 5 mm/min; or a flexural modulus equal to or greater than 1200 MPa, preferably 1200 MPa to 8000 MPa, or at least any one of, equal to any one of, or between any two of, 1200, 2000, 3000, 4000, 5000, 6000, 7000, and 8000, MPa at 23° C., as measured in accordance with ISO 178 at test speed of 5 mm/min; or any combinations thereof. Non-limiting examples of commercially available co-polyesters that can be used includes EASTMAN TRITAN™ COPOLYESTER available from Eastman Chemical Company.

In the context of the present invention, at least the following 20 aspects are described. Aspect 1 is directed to a keyboard comprising: a key cap comprising a first polycarbonate polymer or a cellulose based polymer, wherein at least a portion of the first polycarbonate polymer is a mechanically recycled polymer, and at least a first portion of the cellulose based polymer is obtained from a chemically recycled polymer and at least a second portion of the cellulose based polymer is obtained from a first bio-based renewable source; a pair of cross arms forming a scissor-shaped structure connecting the key cap to a base plate, said scissor-shaped structure is configured to move the key cap up and down relative to the base plate, wherein the scissor-shaped structure comprises a polymeric composition comprising i) 60 wt. % to 100 wt. % of a polyoxymethylene (POM) produced from bio-based methanol and/or recycled $CO_2$, and ii) 0 wt. % to 40 wt. % of a filler comprising glass, preferably glass fiber; and a back light module configured to illuminate when the key cap is pressed down, wherein the back light module comprises a second polycarbonate polymer or a polyester polymer, wherein at least a portion of the second polycarbonate polymer is obtained from a second bio-based renewable source and at least a portion of the polyester polymer is obtained from a chemically recycled polymer, wherein the keyboard has a total recycled and renewable content of equal to or greater than 35 wt. %, preferably 35 wt. % to 60 wt. %, based on the total weight of the keyboard. Aspect 2 is directed to the keyboard of aspect 1, wherein the first polycarbonate polymer has a mechanically recycled content of 75 wt. % to 100 wt. %. Aspect 3 is directed to the keyboard of any one of aspects 1 or 2, wherein the second polycarbonate polymer has a bio-based content of 75 wt. % to 100 wt. %. Aspect 4 is directed to the keyboard of any one of aspects 1 to 3, wherein the second bio-based renewable source is tall oil. Aspect 5 is directed to the keyboard of any one of aspects 1 to 4, wherein the key cap comprises the first polycarbonate polymer and the back light module comprises the second polycarbonate polymer. Aspect 6 is directed to the keyboard of aspect 1, wherein the cellulose based polymer has a chemically recycled content of 5 wt. % to 60 wt. % and a renewable content of 35 wt. % to 65 wt. %. Aspect 7 is directed to the keyboard of any one of aspects 1 or 6, wherein the first portion of the cellulose based polymer is obtained from textile recycling. Aspect 8 is directed to the keyboard of any one of aspects 1 or 6 to 7, wherein the polyester has a chemically recycled content of 25 wt. % to 65 wt. %. Aspect 9 is directed to the keyboard of any one of aspects 1 or 6 to 8, wherein the chemically recycled portion of the polyester is obtained by polymerization of terephthalic acid obtained from chemical recycling of post-consumer polyethylene terephthalate (PET) polymer. Aspect 10 is directed to the keyboard of aspect 9, wherein the polyester is an amorphous copolyester. Aspect 11 is directed to the keyboard of aspect 10, wherein the polyester has a chemically recycled content of 85 wt. % to 100 wt. %. Aspect 12 is directed to the keyboard of any one of aspects 1 of 11, wherein the black light module comprises one or more light guides and the one or more light guides comprises the second polycarbonate polymer or the polyester polymer. Aspect 13 is directed to the keyboard of any one of aspects 1 or 6 to 12, wherein the key cap comprises the cellulose based polymer and the back light module comprises the polyester. Aspect 14 is directed to the keyboard of any one of aspects 1 to 13, wherein the polymer composition of the scissor structure has a tensile modulus greater than 2740 MPa, preferably 4700 MPa to 15000 MPa at 23° C., as measured in accordance with ISO 527. Aspect 15 is directed to the keyboard of any one of aspects 1 to 14, wherein the POM has a recycle and/or bio-based content of 40 wt. % to 70 wt. %. Aspect 16 is directed to a polymeric composition comprising: 60 wt. % to 95 wt. % of a POM, wherein at least a portion of the POM is produced from bio-based methanol and/or recycled $CO_2$; and 5 wt. % to 40 wt. % of a filler comprising glass, preferably glass fiber; wherein the polymer composition has a tensile modulus greater than 2740 MPa, preferably 4700 MPa to 15000 MPa at 23° C., as measured in accordance with ISO 527. Aspect 17 is directed to the polymeric composition of aspect 16, wherein the POM has a total recycled and/or bio-based content of 40 wt. % to 70 wt. %. Aspect 18 is directed to the polymeric composition of any one of aspects 16 to 17, further comprising an additive selected from a pigment, a plasticizer, an antioxidant, an UV-stabilizers, a heat stabilizer, a dye enhancing agent, a lubricant, a mold release agent, a crystal nucleating agent, a fluidability-improving agent, an antistatic agent, an anti-drip agent or any combinations thereof. Aspect 19 is directed to the polymeric composition of any one of aspects 16 to 18, comprising one of, a combination of, or all of the following properties: a density of 1.45 g/cc to 1.75 g/cc 23° C. measured in accordance with ISO 1183; a tensile strength at break greater than 90 MPa preferably 100 MPa to 200 MPa at 23° C., as measured in accordance with ISO 527 at test speed of 5 mm/min; a tensile elongation at break greater than 2.8%, at 23° C., as measured in accordance with ISO 527 at test speed of 5 mm/min; and a flexural modulus greater than 2500 MPa at 23° C., preferably 4000 MPa to 14000 MPa at 23° C., as measured in accordance with ISO 178 at test speed of 5 mm/min Aspect 20 is directed to the polymeric composition of any one of aspects 16 to 19, wherein the composition is comprised in a pair of cross arms forming a scissor-shaped structure that is configured to connect a key cap to a base plate of a keyboard.

EXAMPLES

The present invention will be described in greater detail by way of specific examples. The following examples are offered for illustrative purposes only, and are not intended to limit the invention in any manner Those of skill in the art will readily recognize a variety of noncritical parameters which can be changed or modified to yield essentially the same results.

Example 1

A Polymeric Resin Composition Containing Renewably Sourced Polyoxymethylene (POM) Polymer Table 1 provides a non-limiting POM containing resin composition of the present invention.

TABLE 1

| Resin composition | |
|---|---|
| Components | Wt. % |
| Renewably sourced POM | 80 |
| Glass fibers | 20 |
| Total | 100 |

Components of table 1 were dry blended and melt extruded to form molded compositions containing the resin of table 1.

Mechanical properties of the molded composition was tested using standard methods. The molded resin composition of table 1 had a density of 1.55 g/cc measured in accordance with ASTM D 792, a tensile modulus of 7200 MPa as measured in accordance with ASTM D638 at 5 mm/min, a tensile strength at break, Type I, of 120 MPa as measured in accordance with ASTM D638 at 5 mm/min, and a tensile elongation, Type I, at break of 3%, ASTM D638 at 5 mm/min.

Example 2

A Laptop Keyboard

A laptop keyboard containing a plurality of keycaps, a plurality of scissor-shaped structures and a back light module was made. Table 2 provides the polymers included in the different components of the keyboard of example 2.

Table 2

Composition of the Laptop Keyboard Components

TABLE 2

| Composition of the laptop keyboard components | | |
|---|---|---|
| Keyboard components | Polymer | wt. % of the polymers in the parts |
| Keycaps | Mechanically recycled polycarbonate | 100 |
| Scissor shaped structure | Resin of Example 1 | 90 |
| Light guides of back light module | Renewably sourced polycarbonate | 100 |

Keycaps and scissor shaped structures were formed by injection molding of the respective polymers (table 2). Light guide plate was formed by extrusion of the respective polymer (table 2) into a film/sheet then was embossed into the film/sheet.

The mechanically recycled polycarbonate containing keycaps had a density of 1.2 g/cc measured in accordance with ASTM D 792, recycled and renewable content greater than 75%, a tensile modulus of 2200 MPa as measured in accordance with ASTM D638 at 5 mm/min, a tensile strength at break, Type I, of 62 MPa as measured in accordance with ASTM D638 at 5 mm/min, and a flexural modulus of 2340 MPa as measured in accordance with ISO 178 at test speed of 5 mm/min.

The renewably sourced polycarbonate containing light guides had a density of 1.2 g/cc measured in accordance with ASTM D 792, recycled and renewable content greater than 75%, a tensile modulus of 2200 MPa as measured in accordance with ASTM D638 at 5 mm/min, a tensile strength at break, Type I, of 62 MPa as measured in accordance with ASTM D638 at 5 mm/min, a flexural modulus of 2340 MPa as measured in accordance with ISO 178 at test speed of 5 mm/min and a light transmission greater than 88% as measured by ASTM D1003-00 at sample thickness 1 mm.

Example 3

An External Keyboard

An external keyboard containing a plurality of keycaps, a plurality of scissor-shaped structures and a back light module was made. Table 3 provides the polymers included in the different components of the keyboard of example 3.

TABLE 3

| Composition of the external keyboard components | | |
|---|---|---|
| Keyboard components | Polymer | wt. % of the polymers in the parts |
| Keycaps | Cellulose based polymer | 100 |
| Scissor shaped structure | Resin of Example 1 | 80 |
| Light guides of back light module | Co-polyester polymer | 100 |

Keycaps and scissor shaped structures were formed by injection molding of the respective polymers (table 3). Light guide plate was formed by extrusion of the respective polymer (table 3) into a film/sheet then was embossed into the film/sheet.

The cellulose based polymer containing keycaps had a density of 1.22 g/cc measured in accordance with ASTM D 792, recycled and renewable content about 95%, a tensile modulus of 1800 MPa as measured in accordance with ASTM D638 at 5 mm/min, a tensile strength at break, Type I, of 44 MPa as measured in accordance with ASTM D638 at 5 mm/min, and a flexural modulus of 1700 MPa as measured in accordance with ISO 178 at test speed of 5 mm/min.

The co-polyester polymer containing light guides had a density of 1.18 g/cc measured in accordance with ASTM D 792, recycled and renewable content about 85%, a tensile modulus of 1500 MPa as measured in accordance with ASTM D638 at 5 mm/min, a tensile strength at break, Type I, of 53 MPa as measured in accordance with ASTM D638 at 5 mm/min, a flexural modulus of 1500 MPa as measured in accordance with ISO 178 at test speed of 5 mm/min and a light transmission of 90% as measured by ASTM D1003-00 at sample thickness 1 mm.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:
1. A keyboard comprising:
a key cap comprising a first polycarbonate polymer or a cellulose based polymer, wherein at least a portion of the first polycarbonate polymer is a mechanically recycled polymer, and at least a first portion of the cellulose based polymer is obtained from a chemically recycled polymer and at least a second portion of the cellulose based polymer is obtained from a first bio-based renewable source;

a pair of cross arms forming a scissor-shaped structure connecting the key cap to a base plate, said scissor-shaped structure is configured to move the key cap up and down relative to the base plate, wherein the scissor-shaped structure comprises a polymeric composition comprising i) 60 wt. % to 100 wt. % of a polyoxymethylene (POM) produced from bio-based methanol and/or recycled $CO_2$, and ii) 0 wt. % to 40 wt. % of a filler comprising glass; and a back light module configured to illuminate when the key cap is pressed down, wherein the back light module comprises a second polycarbonate polymer or a polyester polymer, wherein at least a portion of the second polycarbonate polymer is obtained from a second bio-based renewable source and at least a portion of the polyester polymer is obtained from a chemically recycled polymer, wherein the keyboard has a total recycled and renewable content of equal to or greater than 35 wt. % based on the total weight of the keyboard.

2. The keyboard of claim 1, wherein the first polycarbonate polymer has a mechanically recycled content of 75 wt. % to 100 wt. %.

3. The keyboard of claim 1, wherein the second polycarbonate polymer has a bio-based content of 75 wt. % to 100 wt. %.

4. The keyboard of claim 1, wherein the second bio-based renewable source is tall oil.

5. The keyboard of claim 1, wherein the key cap comprises the first polycarbonate polymer and the back light module comprises the second polycarbonate polymer.

6. The keyboard of claim 1, wherein the cellulose based polymer has a chemically recycled content of 5 wt. % to 60 wt. % and a renewable content of 35 wt. % to 65 wt. %.

7. The keyboard of claim 1, wherein the first portion of the cellulose based polymer is obtained from textile recycling.

8. The keyboard of claim 1, wherein the polyester has a chemically recycled content of 25 wt. % to 65 wt. %.

9. The keyboard of claim 1, wherein the chemically recycled portion of the polyester is obtained by polymerization of terephthalic acid obtained from chemical recycling of post-consumer polyethylene terephthalate (PET) polymer.

10. The keyboard of claim 9, wherein the polyester is an amorphous copolyester.

11. The keyboard of claim 10, wherein the polyester has a chemically recycled content of 85 wt. % to 100 wt. %.

12. The keyboard of claim 1, wherein the black light module comprises one or more light guides and the one or more light guides comprises the second polycarbonate polymer or the polyester polymer.

13. The keyboard of claim 1, wherein the key cap comprises the cellulose based polymer and the back light module comprises the polyester.

14. The keyboard of claim 1, wherein the polymer composition of the scissor structure has a tensile modulus greater than 2740 MPa at 23° C., as measured in accordance with ISO 527.

15. The keyboard of claim 1, wherein the POM has a recycle and/or bio-based content of 40 wt. % to 70 wt. %, the glass that the filler comprises is glass fiber, the polymer composition of the scissor structure has a tensile modulus within a range of 4700 MPa to 15000 MPa at 23° C. as measured in accordance with ISO 527, and the total recycled and renewable content of the keyboard is within a range of 35 wt. % to 60 wt. %, based on the total weight of the keyboard.

16. A polymeric composition comprising:
60 wt. % to 95 wt. % of a polyoxymethylene (POM), wherein at least a portion of the POM is produced from bio-based methanol and/or recycled $CO_2$; and
5 wt. % to 40 wt. % of a filler comprising glass;
wherein the polymer composition has a tensile modulus greater than 2740 MPa at 23° C., as measured in accordance with ISO 527, and
wherein the polymeric composition has at least one of the following properties:
a density of 1.45 g/cc to 1.75 g/cc 23° C. measured in accordance with ISO 1183;
a tensile strength at break greater than 90 MPa at 23° C., as measured in accordance with ISO 527 at test speed of 5 mm/min;
a tensile elongation at break greater than 2.8%, at 23° C., as measured in accordance with ISO 527 at test speed of 5 mm/min; and
a flexural modulus greater than 2500 MPa at 23° C., as measured in accordance with ISO 178 at test speed of 5 mm/min.

17. The polymeric composition of claim 16, wherein the POM has a total recycled and/or bio-based content of 40 wt. % to 70 wt. %.

18. The polymeric composition of claim 16, further comprising an additive selected from a pigment, a plasticizer, an antioxidant, an UV-stabilizers, a heat stabilizer, a dye enhancing agent, a lubricant, a mold release agent, a crystal nucleating agent, a fluidability-improving agent, an antistatic agent, an anti-drip agent or any combinations thereof.

19. The polymeric composition of claim 16, wherein the composition is comprised in a pair of cross arms forming a scissor-shaped structure that is configured to connect a key cap to a base plate of a keyboard.

20. The polymeric composition of claim 16, wherein the glass that the filler comprises is glass fiber and the tensile modulus of the polymer composition is within a range of 4700 MPa to 15000 MPa at 23° C., as measured in accordance with ISO 527.

* * * * *